United States Patent
Sclip et al.

(10) Patent No.: US 11,543,282 B2
(45) Date of Patent: Jan. 3, 2023

(54) CONTAMINATION RESISTANT LIQUID LEVEL SENSOR

(71) Applicant: ILLINOIS TOOL WORKS INC., Glenview, IL (US)

(72) Inventors: Marco Sclip, Sumirago (IT); Rocco Corbisiero, Fagnano Olona (IT); Marco Ferrari, Azzate (IT); Davide Bordignon, Travedona-Monate (IT)

(73) Assignee: Illinois Tool Works, Inc., Glenview, IL (US)

( * ) Notice: Subject to any disclaimer, the term of this patent is extended or adjusted under 35 U.S.C. 154(b) by 593 days.

(21) Appl. No.: 16/368,224

(22) Filed: Mar. 28, 2019

(65) Prior Publication Data

US 2019/0301920 A1     Oct. 3, 2019

Related U.S. Application Data

(60) Provisional application No. 62/650,103, filed on Mar. 29, 2018.

(51) Int. Cl.
    *G01F 23/76*     (2006.01)
    *G01F 23/68*     (2006.01)
    *G01F 23/62*     (2006.01)

(52) U.S. Cl.
    CPC .............. *G01F 23/76* (2013.01); *G01F 23/62* (2013.01); *G01F 23/68* (2013.01)

(58) Field of Classification Search
    CPC ........... G01F 23/76; G01F 23/62; G01F 23/68
    See application file for complete search history.

(56) References Cited

U.S. PATENT DOCUMENTS

| | | | |
|---|---|---|---|
| 2,886,624 A | | 5/1959 | Krukowski |
| 4,346,483 A | * | 8/1982 | Rosen ..................... E03D 9/037 222/57 |
| 4,479,915 A | | 10/1984 | Tsubouchi et al. |
| 4,536,719 A | | 8/1985 | Baum et al. |
| 4,920,797 A | | 5/1990 | Swartz et al. |
| 5,294,917 A | | 3/1994 | Wilkins |
| 6,230,561 B1 | | 5/2001 | Li |
| 6,959,598 B2 | | 11/2005 | Peterson et al. |
| 7,342,395 B2 | | 3/2008 | Thomas et al. |

(Continued)

FOREIGN PATENT DOCUMENTS

| DE | 1276919 B | 9/1968 |
|---|---|---|
| FR | 1336826 | 9/1963 |

(Continued)

OTHER PUBLICATIONS

International Search Report for Application PCT/US2019/024827; dated Sep. 24, 2019.

(Continued)

*Primary Examiner* — Suman K Nath
(74) *Attorney, Agent, or Firm* — Boyle Fredrickson, S.C.

(57) ABSTRACT

A liquid-level sensor provides a downwardly pendent float supported above the reservoir fill height using high clearance downwardly extending fingers and a spring that resist encrustation of the float support mechanism. The spring may be a flat helix to reduce the height of the sensing mechanism when so positioned. A sensor sealed within a sensor head electrically senses the float height through a sealed compartment to be contamination resistant.

18 Claims, 3 Drawing Sheets

(56) References Cited

U.S. PATENT DOCUMENTS

| | | |
|---|---|---|
| 9,709,435 B2 | 7/2017 | Dockendorff et al. |
| 2006/0123816 A1* | 6/2006 | Dlugos ................ F25B 41/315 |
| | | 62/218 |
| 2016/0041022 A1* | 2/2016 | Caplan .................... G01F 23/26 |
| | | 73/290 V |

FOREIGN PATENT DOCUMENTS

| | | | |
|---|---|---|---|
| FR | 1359225 A | 4/1964 | |
| GB | 754850 A | 8/1956 | |

OTHER PUBLICATIONS

Examination Report for Application No. EP 19722284.7; dated Feb. 4, 2022, 6 pages.

* cited by examiner

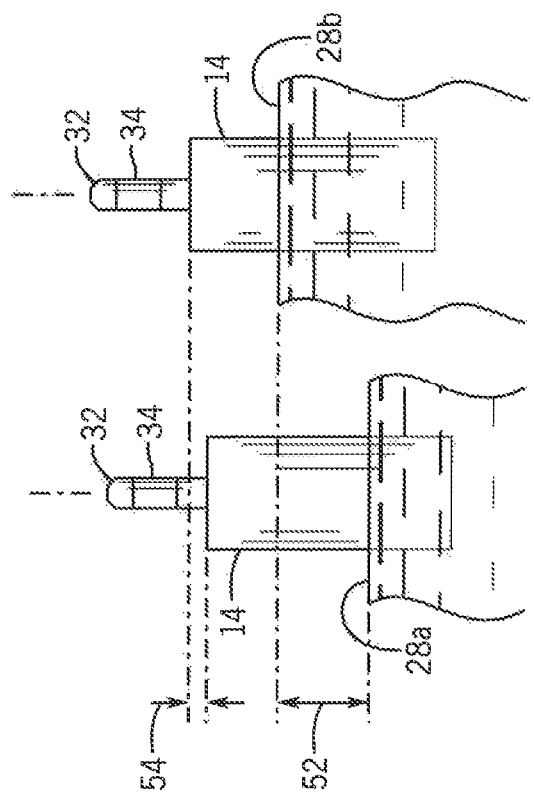
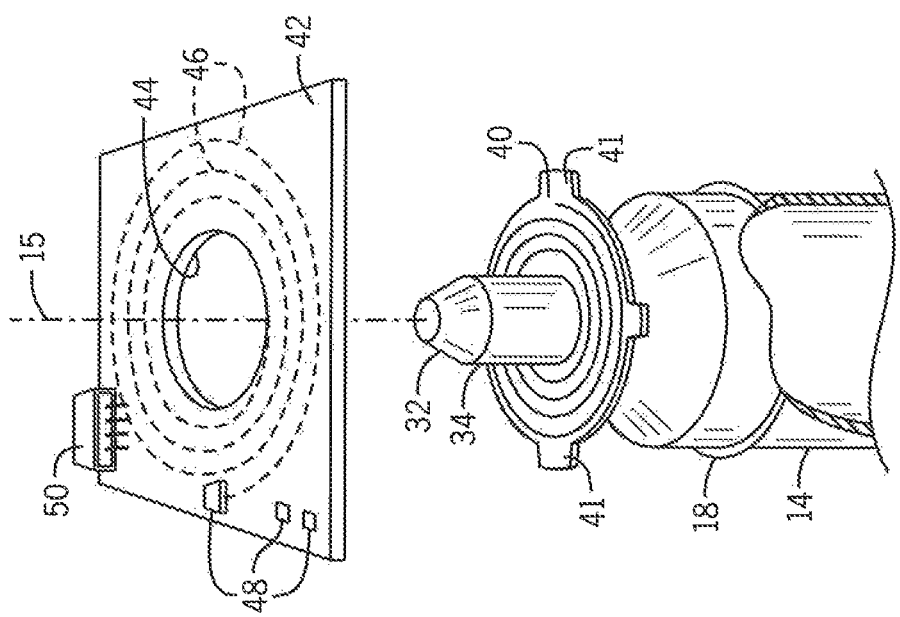
FIG. 2
FIG. 3

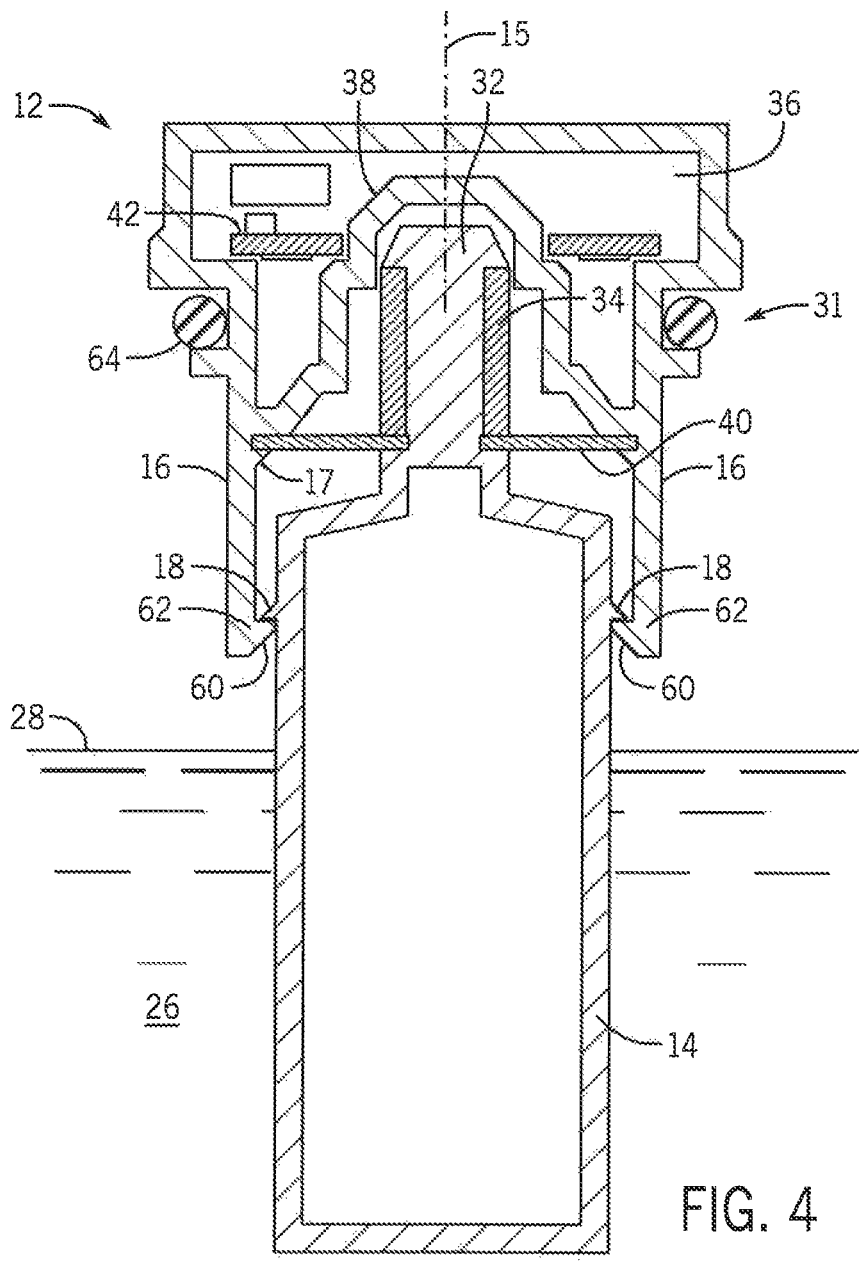
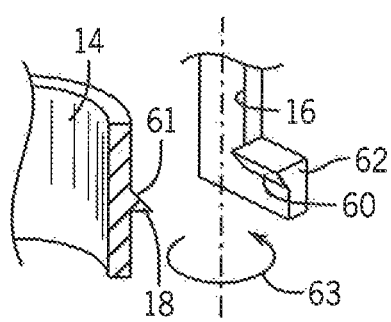
FIG. 4
FIG. 5

CONTAMINATION RESISTANT LIQUID LEVEL SENSOR

CROSS REFERENCE TO RELATED APPLICATION

This application claims the benefit of U.S. provisional application 62/650,103 filed Mar. 29, 2018, and hereby incorporated by reference.

FIELD OF THE INVENTION

The present invention relates to liquid level sensors and the like and specifically to a liquid level sensor suitable for liquid such as liquid detergents that can encrust moving parts and interfere with electronic circuitry.

BACKGROUND OF THE INVENTION

Modern appliances may include multiple automatic dispensers or reservoirs, for example, for dispensing detergents and wash aids or retaining clean or contaminated water, where it would be desirable to sense the liquid level to provide notice to the appliance user when these cleaning materials are nearly exhausted or when reservoirs need to be emptied or checked to ensure proper operation of the appliance. In many cases, it may be desirable to be able to distinguish among multiple liquid level heights to provide a more complete picture of the amount of material held in the dispenser or reservoir.

It is generally known to sense liquid height through the use of a float that moves, for example, on an arm or guide with changes in height of the liquid. The position of the float may be monitored electronically, for example, by means of a limit switch. Liquid height sensors employing antennas that are partially submerged in the liquid are also known.

In many cases, the liquids being sensed have a significant content of dissolved solids that can become deposited on moving surfaces of the sensor (for example, floats that move along the guide) or that can coat antennas or other electronic sensors in a way that interferes with their operation.

SUMMARY OF THE INVENTION

The present invention provides a float supported at its upper edge above the highest expected level of the liquid, thereby removing the float support structure from contamination. A spring biases the float downward to provide a ratiometric movement of the float at with changes in liquid height, minimizing float movement to provide an extremely compact support structure and permitting that structure to be better removed from the liquid. Float movement is sensed with an inductive sensor fully contained within a sensor housing fully shielded from the float and the liquid being sensed. The inductive sensing allows high clearance between the float structure and the sensing head also better resisting obstruction by contamination. A printed circuit coil may be used for the inductive measurement also providing an extremely low-profile sensor head.

Specifically, in one embodiment, the invention provides a liquid level sensor having an elongate float and sensor head providing a sealed compartment. The sensor head is adapted to be a received at an opening in an upper wall of a reservoir and provides downwardly extending guides for supporting the elongate float for motion along a vertical axis beneath the sensor head. A sensor fitting within the sealed compartment senses a height of the elongate float with respect to the sensor head, and a spring extending between the sensor head in the elongate float biases the elongate float downward against of buoyant forces on the elongate float.

It is thus a feature of at least one embodiment of the invention to provide a compact float-type liquid level sensor. The vertical motion of the float avoids the horizontal space required for swing-arm type float mounts. The spring provides reduced vertical motion of the float thus decreasing the vertical height of the liquid level sensor.

The downwardly extending guides may be fingers having inwardly extending teeth for engaging an outwardly extending rim on the elongate bottle.

It is thus a feature of at least one embodiment of the invention to provide an open frame construction less susceptible to retaining the liquid that can dry to produce adhesion between the parts.

The outwardly extending rim and inwardly extending teeth have opposed sloped surfaces that may provide an upward snap engagement with upward movement of the bottle with respect to the fingers.

It is thus a feature of at least one embodiment of the invention to provide a simple assembly technique requiring only upward pressing of the float into the sensor head.

The inwardly extending teeth and outwardly extending rim may contact when the elongate float is in the lowermost engaged position over less than 25% of the circumferential length of the rim.

It is thus a feature of at least one embodiment of the invention to minimize the contact between the elongate float and the support such as might promote adhesion caused by materials of the sensed liquid.

The elongate float may extend by a first distance beneath a lowermost extent of the downwardly extending guides greater than a second distance above the lowermost extent of the downwardly extending guides.

It is thus a feature of at least one embodiment of the invention to displace the float and its contact with liquid below the sensor head and its guides to reduce the risk of buildup from interfering with motion of the float.

The liquid level sensor spring may be constructed of a polymer material.

It is thus a feature of at least one embodiment of the invention to permit exposure of the spring to promote drainage and assembly while resisting corrosion.

The spring maybe mounted above a lowermost extent of the downwardly extending guides.

It is thus a feature of at least one embodiment of the invention to provide sufficient guidance to the float to promote linear motion by separated float guidance points at the spring and beneath the spring at the lower extent of the downwardly extending guides.

The spring may be planar sheets of material having a spiral slot and a central opening attached to the elongate float to extend perpendicularly to the vertical axis and an outer periphery attached to surrounding walls of the sensor head.

It is thus a feature of at least one embodiment of the invention to provide a low profile spring that is highly resistant to contamination.

The outer periphery of the spring may provide radially extending tabs that flex downward to pass upwardly past a lower edge of the surrounding walls and then to flex outward to engage corresponding holes in the surrounding walls when aligned with those holes.

It is thus a feature of at least one embodiment of the invention to permit simple assembly of the liquid level sensor by an upward pressing of the float, holding the spring, into the sensor head.

The tabs may engage the corresponding holes at a relative location between the elongate float in the sensor head before an engagement between the downwardly extending guides in the elongate float.

It is thus a feature of at least one embodiment of the invention to provide a slight preload to the spring to minimize bouncing such as could create sensor errors.

The sensor may be an inductive sensor and an upper portion of the elongate float provides an upwardly extending inductive element at the top of the elongate float.

It is thus a feature of at least one embodiment of the invention to provide a sensor system that does not require close contact such as may lead to adhesion between the float in the sensor head.

The sealed compartment may include an inwardly extending pocket for receiving the upwardly extending inductive element.

It is thus a feature of at least one embodiment of the invention to permit the sensing electronics to be fully sealed away from the liquid being sensed.

The inductive sensor may provide an antenna formed as a spiral on cladding of a printed circuit board having a hole fitting around the inwardly extending pocket. The cladding and spiral may be on the bottom of the printed circuit board toward the elongate float.

It is thus a feature of at least one embodiment of the invention to provide close proximity between the sensor antenna and the sealed sensor system.

The inductive element may be a ferrite element.

It is thus a feature of at least one embodiment of the invention to provide an inductive element that is readily sensed and yet resistant to corrosion.

The elongate float may be a polymer container having an enclosed air pocket sealed within the bottle and wherein the container may have a substantially constant cross-sectional area in portions of the container that extend below the downwardly extending guides.

It is thus a feature of at least one embodiment of the invention to provide a strong corrosion resistant float that provides an upward buoyancy that is proportional to liquid height to improve sensing linearity.

The sensor may further include the reservoir wherein the reservoir may have a fill height mark indicating a maximum fill level of the reservoir and the downwardly extending guides may be above the fill line mark when the sensor head is installed on the reservoir.

It is thus a feature of at least one embodiment of the invention to provide a sensor system that is resistant to contamination preventing free movement of the float with respect to the sensor head by displacing the contact between the sensor head and float above the maximum height.

Other features and advantages of the invention will become apparent to those skilled in the art upon review of the following detailed description, claims and drawings in which like numerals are used to designate like features.

BRIEF DESCRIPTION OF THE DRAWINGS

FIG. 2 is a perspective fragmentary view of an upper portion of the float attached to a spiral-cut spring plate for biasing the float downward and showing a sensor plug holding a ferrite cylinder attached to the upper end of the float for passing into an aperture in a printed circuit board holding a pancake coil and inductive measurement circuitry for measuring float height;

FIG. 3 is a diagrammatic, side elevational view of the float in two positions as biased by the spring of FIG. 2 showing the operation of the spring to reduce float motion to a fraction of change in liquid height;

FIG. 4 is an elevational cross-section along line 4-4 of FIG. 1 showing the internal positioning of components of the sensor head and float of FIG. 1;

FIG. 5 is a fragmentary view of a downwardly extending finger from the sensor head showing teeth that may engage a rim on the float by flexure.

Figure 1:
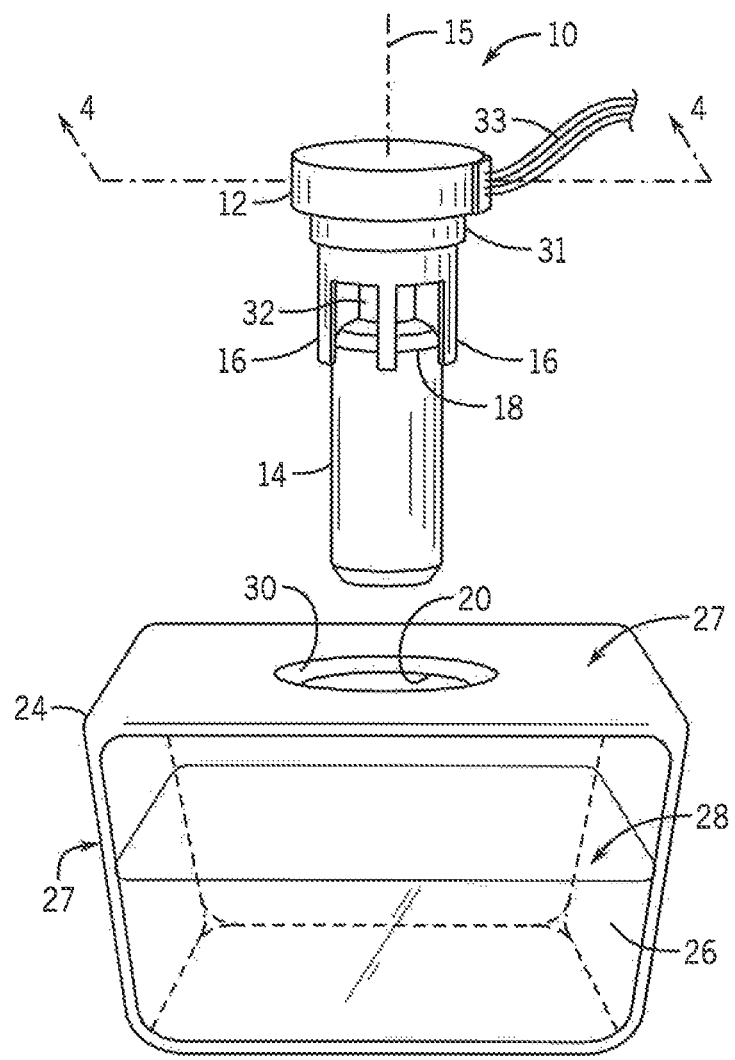
FIG. 1 is a perspective view of one embodiment of the liquid height sensor of the present invention positioned above a reservoir for measuring liquid within the reservoir, the latter shown in partial cross-section, the liquid height sensor including a sensor head supporting a pendant float.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENT

Referring now to FIG. 1, a liquid level sensor 10 of the present invention may include a sensor head 12 positioned above and supporting a dependent float 14. The float 14, for example, may be an enclosed, elongate, hollow polymer cylinder having a cylinder axis aligned with a vertical sensor axis 15. An upper end of the float 14 may be retained by a set of fingers 16 extending downwardly from the sensor head 12 to support a rim 18 circling an upper end of the float 14 allowing relative upward motion of the float 14 with respect to the sensor head 12 along axis 15.

The body of the float 14 may pass through a circular opening 20 in an upper wall 22 of a fluid container containing a fluid 26, for example, a detergent, wash aid, water, or contaminated water, whose level 28 must be sensed. The circular opening 20 may be positioned within a threaded collar 30 engaging with a corresponding collar 31 on the sensing head 12 so that the two may be securely attached together during use, for example, by a slight relative rotation. The fluid container 24 may have a maximum fill height 27 indicated by a molding mark or other fiducial indication indicating a maximum liquid height. The fingers 16 will end above this level so that they are generally removed from contamination.

The sensing head 12 provides sensor electronics for sensing the position of the float 14 with respect to the sensing head 12 as will be described, the sensor electronics providing signals over a connecting harness 33 which, in turn, may also provide power to the contained electronics.

Referring now to FIGS. 2 and 4, the float 14 may be a generally cylindrical bottle having a constant cross-section on those portions beneath the rim 18 so as to provide a predictable restoring force with rises in liquid level. The float 14 may be constructed of a polymer material to be resistant to corrosion and may have an internal sealed air pocket. An upper end of the float 14 may support an upwardly extending, generally cylindrical sensor plug 32 coaxially positioned along axis 15 and having a reduced diameter with respect to the diameter of the float 14. The sensor plug 32 may support on its outer surface a cylindrical ferrite 34 that may extend upward into the sensor head 12 with motion of the float 14 along the axis 15. In this regard, the sensor head 12 provides an enclosed, sealed volume 36 shielded from environmental contamination and including at its lower surface an upwardly extending pocket 38 extending into the enclosed volume 36 so that the sensor plug 32 and ferrite cylinder 34 may move into the pocket 38 with elevation of the float 14 corresponding to a rise in the liquid level 28.

A spiral spring 40, being generally a thin disk of metal or of a polymer material providing a set of concentric spiral slots, provides a restoring force pressing downward on the float 14 against its upward motion into the pocket 38 as the spiral spring 40 is moved out of its planar configuration. The outer periphery of the spiral spring 40 may attach to the structure of the sensor head 12 above the fingers 16, and the inner periphery of the spiral spring 40 may attach to the plug 32 immediately beneath the ferrite cylinder 34 and removed from the pocket 38. As well as providing a biasing along axis 15, spiral spring 40 may also provide a restoring force preserving axial alignment of the float 14 along axis 15. Generally the extent of the spiral spring 40 when in a relaxed planar configuration will extend perpendicularly to the axis 14. The outer periphery of the spiral spring 40 may have tabs 41 that fit in corresponding holes or notches in the walls of the sensor head 12 surrounding the spiral spring 40 and may be installed by pressing upward on the float 14 with spiral spring 40 engaged until the tabs slide over bevel surfaces 17 and snap into place in the walls of the sensor head 12 for easy installation. At this point the rim 18 will be above the teeth 62 so those will also be engaged.

The enclosed volume 36 of the sensor head 12 holds a circuit board 42 having a central aperture 44 coaxially around axis 15 and fitting around the upwardly extending pocket 38 allowing the sensor plug 32 and ferrite cylinder 34 to move into and through a plane defined by the lower face of that circuit board 42. The circuit board 42 is fully isolated within the volume 36, however, from the environment to which the sensor plug 32 is exposed.

A lower surface of the printed circuit board 42 supports a spiral conductor 46 which may be etched into the copper cladding of the circuit board 42 and which provides a loop antenna representing an inductance. In an alternative embodiment, a standard bobbin wound coil (copper wire wound around a spool) may be used to provide a tighter flux pattern more resistant to outside metal elements. Movement of the ferrite cylinder 34 closer to and further away from the spiral conductor 46 changes the inductance of the spiral conductor 46 which may be measured by measurement circuitry 48 supported on the opposite side of the printed circuit board 42. Such measurement circuitry 48, for example, may provide a resonant circuit employing the inductance of the spiral conductor 46 to produce an oscillation whose frequency is monitored, for example, by counting or other means, to provide an electrical value that can be correlated to the vertical position of the float 14 with respect to the sensor head 12. The circuitry 48 includes a threshold sensor to compare the electrical value to a threshold so that the circuitry 48 may output (through connector 50 (FIG. 2) to the harness 33 (FIG. 1)) an electrical signal that either provides a single, binary value-indicating float 14 being above or below a threshold, or an analog value (either being an analog voltage, analog frequency, or binary number) indicating a range of positions of the float 14 with respect to sensor head 12. Generally, it will be appreciated that the circuit board 42 is a thermoplastic material such as glass fiberglass and thus electrically neutral with respect to influencing the inductance of the spiral conductor 46.

Referring now to FIG. 2 and FIG. 3, the spiral spring 40 controls a ratio between a change in height of the liquid level 28 (for example, from 28*a* to 28*b*) to a change of height 54 of the float 14 allowing relatively small motions of the float 14 to relate to much larger changes in the liquid level 28 accommodating the sensitivity of the inductance sensing system and allowing a more compact sensing head 12. This compactness of the height of the sensing head 12 is further aided by the flat form factor of the spiral conductor 46.

The collar 31 of the sensor head 12 may provide for an O-ring 64 to seal the sensing head 12 against the container 24 as so installed as retained by twist lock or threads (not shown).

Referring again to FIG. 4 and also to FIG. 5, an upper edge of the rim 18 of the float 14 may have an outward and downward bevel 61 so as to allow the float 14 to be snapped into place within the fingers 16 by the bevel 61 pressing outward on corresponding sloped lower faces 60 of inwardly extending teeth 62 on the lower ends of the fingers 16 as the float 14 is pressed upward for easy assembly. Such upward motion of the float 14 seats the periphery of the spiral spring 40 against downwardly facing retaining ledges of the sensor head 12. In this regard, the inwardly extending teeth 62 may be positioned circumferentially displaced from the downward extent of the fingers 16 to allow engagement and disengagement through slight torsion 63 of the fingers 16 allowing them to otherwise retain good alignment with axis 15. Generally the circumferential extent of the teeth 62 will be far less than 25% of the circumferential length of the rim 18 to reduce the possibility of adhesion between these two greater than the force on the float 14.

The float 14 will extend below the rim 18 by a distance greater than its extent above the rim 18 and generally the same relationship will be true with respect to the lowermost downward extent of the fingers 16 so that the engagement between the rim 18 and the teeth 62 may be displaced far from the surface of the liquid being measured.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

The embodiments described herein explain the best modes known for practicing the invention and will enable others skilled in the art to utilize the invention.

What is claimed is:

1. A liquid level sensor for determining a level of a volume of liquid in an appliance reservoir, the liquid level sensor comprising:
   an elongate float;
   a sensor head providing a sealed compartment, wherein the sensor head:
      is adapted to be received at an opening in an upper wall of an appliance reservoir;
      includes a collar that engages the upper wall of the appliance reservoir to provide a sealed engagement between the collar and the upper wall of the appliance reservoir;
      provides downwardly extending guides for supporting the elongate float for motion along a vertical axis beneath the sensor head;
   a sensor mounted within the sealed compartment to sense a height of the elongate float with respect to the sensor head; and
   a spring extending between the sensor head and the elongate float to bias the elongate float downward against buoyant forces on the elongate float.

2. The liquid level sensor of claim 1 wherein:
   the elongate float is defined by an elongate bottle with an outwardly extending rim; and
   the downwardly extending guides are defined by fingers having inwardly extending teeth for engaging the outwardly extending rim on the elongate bottle.

3. The liquid level sensor of claim 2 wherein the outwardly extending rim and inwardly extending teeth have opposed sloped surfaces providing an upward snap engagement with upward movement of the bottle with respect to the fingers.

4. The liquid level sensor of claim 2 wherein the inwardly extending teeth and outwardly extending rim contact when the elongate float is in the lowermost engaged position over less than 25% of the circumferential length of the rim.

5. The liquid level sensor of claim 1 wherein the elongate float extends by a first distance beneath a lowermost extent of the downwardly extending guides greater than a second distance above the lowermost extent of the downwardly extending guides.

6. The liquid level sensor of claim 1 wherein the spring is polymer material.

7. The liquid level sensor of claim 1 wherein the spring is mounted above a lowermost extent of the downwardly extending guides.

8. The liquid level sensor of claim 1 wherein the sensor is an inductive sensor and an upper portion of the elongate float provides an upwardly extending inductive element at the top of the elongate float.

9. The liquid level sensor of claim 8 wherein the sealed compartment includes an inwardly extending pocket for receiving the upwardly extending inductive element.

10. The liquid level sensor of claim 9 wherein the inductive sensor provides an antenna formed as a spiral on cladding of a printed circuit board having a hole fitting around the inwardly extending pocket.

11. The liquid level sensor of claim 10 wherein the spiral is formed on the bottom of the printed circuit board toward the elongate float.

12. The liquid level sensor of claim 8 wherein the inductive element is a ferrite element.

13. The liquid level sensor of claim 1 wherein the elongate float is a polymer container having an enclosed air pocket sealed within the container and wherein the container has a substantially constant cross-sectional area in portions of the container that extend below the downwardly extending guides.

14. The liquid level sensor of claim 1 further including the reservoir wherein the reservoir has a fill height mark indicating a maximum fill level of the reservoir and wherein the downwardly extending guides are above the fill line mark when the sensor head is installed on the reservoir.

15. The liquid level sensor of claim 1 wherein the sensor head includes an O-ring for sealing the sensor head to the opening in the reservoir.

16. A liquid level sensor comprising:
   an elongate float;
   a sensor head providing a sealed compartment, the sensor head adapted to be received at an opening in an upper wall of a reservoir and providing downwardly extending guides for supporting the elongate float for motion along a vertical axis beneath the sensor head;
   a sensor mounted within the sealed compartment to sense a height of the elongate float with respect to the sensor head;
   a spring extending between the sensor head and the elongate float to bias the elongate float downward against buoyant forces on the elongate float; and
   wherein the spring is planar sheets of material having a spiral slot and a central opening attached to the elongate float to extend perpendicularly to the vertical axis and an outer periphery attached to surrounding walls of the sensor head.

17. The liquid level sensor of claim 16 wherein the outer periphery provides radially extending tabs that flex downward to pass upwardly past a lower edge of the surrounding walls and then to flex outward to engage corresponding holes in the surrounding walls when aligned with those holes.

18. The liquid level sensor of claim 17 wherein the tabs engage the corresponding openings at a relative location between the elongate float in the sensor head before an engagement between the downwardly extending guides in the elongate float.

* * * * *